UNITED STATES PATENT OFFICE.

GUSTAV RUMPF, OF FRANKFORT-ON-THE-MAIN, PRUSSIA, GERMANY, ASSIGNOR TO THE VEREIN FÜR CHEMISCHE INDUSTRIE IN MAINZ.

PROCESS OF PRODUCING CHLORINE.

SPECIFICATION forming part of Letters Patent No. 348,348, dated August 31, 1886.

Application filed April 6, 1886. Serial No. 197,995. (No model.)

*To all whom it may concern:*

Be it known that I, GUSTAV RUMPF, a resident of the city of Frankfort-on-the-Main, in the Kingdom of Prussia, German Empire, have invented an Improvement in the Process of Producing Chlorine and Chlorine and Ammonia, of which the following is a full, clear, and exact description.

The invention relates to the production in the dry way of chlorine with or without sal-ammoniac by passing vapors containing chlorine over metallic oxides at a proper temperature and in a continuous operation.

The new process is carried out in the following manner: Sal-ammoniac vapors or gases, or vapors containing them, are passed over an oxide of manganese at the proper temperature below the red-hot state. This produces chloride of manganese, ammonia, and water. The action, if protoxide of manganese is used, is shown theoretically by the formula: $MnO + 2NH_4Cl = MnCl_2 + 2NH_3 + H_2O$. If oxygen gas, preferably in the form of atmospheric air, is now passed over the resulting chloride of manganese, the original oxide of manganese and free chlorine are obtained: $MnCl_2 + O = MnO + 2Cl$. With this method all oxides of manganese can be employed, namely: Protoxide of manganese, $MnO$, sesquioxide of manganese, $Mn_2O_3$, the combination of protoxide and oxide of manganese, $Mn_3O_4$, peroxide of manganese, $MnO_2$, three oxide of manganese $MnO_3$, &c. If hydrochloric-acid vapors, or vapors or gases containing them, are employed in place of sal-ammoniac vapors, chloride of manganese is produced as well as water-vapor, $MnO + 2HCl = MnCl_2 + H_2O$. By the use of oxygen (air) at the proper temperature, as above described, a portion of the clorine becomes free, the oxide of manganese employed being regenerated simultaneously. $MnCl_2 + O = MnO + 2Cl$. If higher oxides of manganese are employed, a portion of the chlorine becomes free in forming the chloride of manganese. For sesquioxide of manganese, for example, $Mn_2O_3 + 6HCl = 2MnCl_2 + 3H_2O + 2Cl$. By then using oxygen (air) the balance of the chlorine is again liberated, the oxide of manganese being regenerated. $2MnCl_2 + 3O = Mn_2O_3 + 4Cl$.

In many cases the air can be used at the same time as the acid vapors.

The operations may be performed in suitable retorts.

The oxides of manganese, as shown in the formulas, are always regenerated, and remain in a dry state; hence, it is not necessary to renew the charge of the apparatus, and the price of the materials is of no great importance.

The above described process can also be carried on by using oxides of other metals than manganese, and by using volatile chlorine compounds in place of sal-ammoniac and hydrochloric-acid vapors.

I claim—

The process of producing chlorine, which consists in carrying sal-ammoniac vapors, or vapors or gases containing them, over an oxide of manganese, or bodies containing the same, and in decomposing the resulting chloride of manganese by passing atmospheric air over the chloride of manganese, substantially as described.

This specification signed by me this 26th day of February, 1886.

GUSTAV RUMPF.

Witnesses:
 HERMANN DIETZE,
 THEODAR FELKA.